United States Patent [19]
Miller et al.

[11] Patent Number: 5,969,431
[45] Date of Patent: Oct. 19, 1999

[54] LINEARLY ACTUATING MULTI-FUNCTIONAL APPARATUS FOR USE IN AN AUTOMOTIVE VEHICLE

[75] Inventors: Robin Mihekun Miller, Ellington, Conn.; Monte L. Falcoff, Beverly Hills, Mich.

[73] Assignee: Lear Automotive Dearborn, Inc., Southfield, Mich.

[21] Appl. No.: 08/947,369

[22] Filed: Oct. 8, 1997

[51] Int. Cl.⁶ .................................................. B60L 1/00
[52] U.S. Cl. ............................................................ 307/10.1
[58] Field of Search .................................... 307/9.1–10.6;
318/443, 445, 446, 447, 448, DIG. 2, 470,
8, 9, 10, 14, 15, 4; 15/250.19, 250.17, 256.5;
296/76, 96.15; 292/DIG. 25, DIG. 43; 192/69.8,
698.2, 89.21; 70/237, 255, 258, 278; 701/36,
49; 361/139, 143, 144, 191–193, 160

[56] References Cited

U.S. PATENT DOCUMENTS

| | | |
|---|---|---|
| 2,271,207 | 1/1942 | Rhein . |
| 2,345,778 | 4/1944 | Lammeren et al. . |
| 2,615,945 | 10/1952 | Jaeschke . |
| 2,659,237 | 11/1953 | Wood . |
| 2,722,617 | 11/1955 | Cluwen et al. . |

(List continued on next page.)

FOREIGN PATENT DOCUMENTS

| | | |
|---|---|---|
| 0 345 002 A2 | 6/1989 | European Pat. Off. . |
| 737.616 | 12/1932 | France . |
| 1.039.265 | 10/1953 | France . |
| 1.281.424 | 12/1961 | France . |
| 822 178 | 11/1951 | Germany . |
| 27 28 088 | 1/1978 | Germany . |
| 28 16 207 A1 | 10/1979 | Germany . |
| 3807087 A1 | 9/1989 | Germany . |
| 39 23 688 A1 | 1/1991 | Germany . |
| 40 28 289 A1 | 3/1992 | Germany . |
| 43 13 363 A1 | 11/1993 | Germany . |
| 43 37 760 A1 | 5/1994 | Germany . |
| 56-22150 | 2/1981 | Japan . |
| 5-86761 | 6/1993 | Japan . |
| 2 153 218 | 8/1985 | United Kingdom . |
| WO 96/33891 | 10/1996 | WIPO . |
| WO 96/33892 | 10/1996 | WIPO . |
| WO 96/33893 | 10/1996 | WIPO . |
| WO 98/03756 | 1/1998 | WIPO . |

OTHER PUBLICATIONS

PCT International Search Report dated Feb. 11, 1999 for PCT/US98/18973.
Patent Abstracts of Japan, vol. 016, 7–438 (M–1309), Sep. 11, 1992 for JP Patent Publication No. 04151351.
P. 100, *Machine Design*, 60(1988) Oct. 13, No. 24, Cleveland, Ohio, US.
"Goodheart–Wilcox Automotive Encyclopedia", William K. Toboldt, Larry Johnson, Steven W. Olive, 1989, pp. 723–727.
"Automotive Handbook", Bosch 3rd Edition, 1993, pp. 694–697.
"Kinematic Analysis of Mechanisms", 1959, J.E. Shigley, pp. 228–231.
"Genevamation Indexing Drives", Jan. 12, 1995 Catalog No. 693, Geneva Mechanisms Corporation.

(List continued on next page.)

*Primary Examiner*—Richard T. Elms
*Attorney, Agent, or Firm*—Harness, Dickey & Pierce, P.L.C.

[57] ABSTRACT

A linearly actuating multi-functional apparatus for use in an automotive vehicle includes a single electromagnetic device which linearly operates a pair of mechanical devices. In another aspect of the present invention, a plunger of a solenoid is selectively moved between various longitudinal positions in order to directly and linearly move a portion of a first mechanical device interfacing with a window assembly and move a portion of a second mechanical device, such as a door lock or latch.

17 Claims, 8 Drawing Sheets

U.S. PATENT DOCUMENTS

| | | |
|---|---|---|
| 2,953,802 | 9/1960 | Ziegler . |
| 2,959,803 | 11/1960 | Ziegler . |
| 3,163,791 | 12/1964 | Carlson . |
| 3,248,579 | 4/1966 | Plasko . |
| 3,361,005 | 1/1968 | Carpenter . |
| 3,361,947 | 1/1968 | Schlebusch . |
| 3,421,380 | 1/1969 | Mansour . |
| 3,442,146 | 5/1969 | Simpson . |
| 3,443,442 | 5/1969 | Schweihs . |
| 3,443,455 | 5/1969 | Zugel . |
| 3,516,610 | 6/1970 | Stevens . |
| 3,523,204 | 8/1970 | Rand . |
| 3,549,917 | 12/1970 | Buhlertal et al. . |
| 3,574,882 | 4/1971 | Petry . |
| 3,619,676 | 11/1971 | Kawakami . |
| 3,629,747 | 12/1971 | Findley . |
| 3,659,128 | 4/1972 | Danek . |
| 3,665,772 | 5/1972 | Beard et al. . |
| 3,688,332 | 9/1972 | Bellware . |
| 3,689,817 | 9/1972 | Elliott . |
| 3,694,723 | 9/1972 | Schneider et al. . |
| 3,705,520 | 12/1972 | Carpenter . |
| 3,715,694 | 2/1973 | Kruger . |
| 3,751,086 | 8/1973 | Geringer . |
| 3,803,627 | 4/1974 | Schuscheng . |
| 3,858,922 | 1/1975 | Yamanaka . |
| 3,917,330 | 11/1975 | Quantz . |
| 3,927,436 | 12/1975 | Inoue et al. . |
| 3,942,614 | 3/1976 | Thompson . |
| 3,960,235 | 6/1976 | Iijima . |
| 4,009,952 | 3/1977 | Badalich et al. . |
| 4,065,234 | 12/1977 | Yoshiyuki et al. . |
| 4,096,930 | 6/1978 | Viscardi . |
| 4,158,159 | 6/1979 | Orris et al. . |
| 4,173,055 | 11/1979 | Izumi et al. . |
| 4,183,114 | 1/1980 | Eden . |
| 4,259,624 | 3/1981 | Seibicke . |
| 4,271,381 | 6/1981 | Munz et al. . |
| 4,309,646 | 1/1982 | Liedtke et al. . |
| 4,335,418 | 6/1982 | Clement . |
| 4,336,482 | 6/1982 | Goertler et al. . |
| 4,352,299 | 10/1982 | Riggs et al. . |
| 4,422,522 | 12/1983 | Slavin et al. . |
| 4,434,678 | 3/1984 | Maus . |
| 4,450,390 | 5/1984 | Andrei-Alexandru et al. . |
| 4,473,141 | 9/1984 | Mochida . |
| 4,478,004 | 10/1984 | Andrei-Alexandru et al. . |
| 4,492,904 | 1/1985 | Graham . |
| 4,507,711 | 3/1985 | Ono et al. . |
| 4,553,656 | 11/1985 | Lense . |
| 4,573,723 | 3/1986 | Morita et al. . |
| 4,630,178 | 12/1986 | Mugford et al. . |
| 4,639,065 | 1/1987 | Kohler et al. . |
| 4,660,698 | 4/1987 | Miura . |
| 4,674,781 | 6/1987 | Reece et al. . |
| 4,701,972 | 10/1987 | Saito . |
| 4,702,117 | 10/1987 | Tsutsumi et al. . |
| 4,724,760 | 2/1988 | Bubley . |
| 4,733,147 | 3/1988 | Muller et al. . |
| 4,752,786 | 6/1988 | Inoue et al. ......................... 346/139 R |
| 4,793,640 | 12/1988 | Stewart, Sr. . |
| 4,816,083 | 3/1989 | Bangyan ................................ 137/271 |
| 4,875,053 | 10/1989 | Harada . |
| 4,878,398 | 11/1989 | Heinrich . |
| 4,885,512 | 12/1989 | Gille et al. . |
| 4,887,702 | 12/1989 | Ratke et al. . |
| 4,893,039 | 1/1990 | Isii . |
| 4,918,272 | 4/1990 | Nishikawa . |
| 5,007,131 | 4/1991 | Chevalier et al. . |
| 5,023,530 | 6/1991 | Ohashi et al. . |
| 5,027,929 | 7/1991 | Ratke et al. . |
| 5,027,931 | 7/1991 | Ratke et al. . |
| 5,045,741 | 9/1991 | Dvorsky . |
| 5,050,922 | 9/1991 | Falcoff . |
| 5,063,317 | 11/1991 | Bruhn . |
| 5,076,114 | 12/1991 | Moody . |
| 5,078,242 | 1/1992 | Ratke et al. . |
| 5,176,231 | 1/1993 | Moody et al. . |
| 5,182,957 | 2/1993 | Bohmer et al. . |
| 5,214,440 | 5/1993 | Takahashi et al. . |
| 5,218,255 | 6/1993 | Horiguchi . |
| 5,222,775 | 6/1993 | Kato . |
| 5,228,239 | 7/1993 | Heo . |
| 5,251,114 | 10/1993 | Cantin et al. . |
| 5,274,875 | 1/1994 | Chou . |
| 5,291,109 | 3/1994 | Peter . |
| 5,315,735 | 5/1994 | I-Shin . |
| 5,333,351 | 8/1994 | Sato . |
| 5,355,061 | 10/1994 | Forhan . |
| 5,355,286 | 10/1994 | Flint . |
| 5,373,605 | 12/1994 | Austin . |
| 5,427,345 | 6/1995 | Yamakami et al. . |
| 5,462,337 | 10/1995 | Yamakami . |
| 5,519,258 | 5/1996 | Stroven et al. . |
| 5,528,959 | 6/1996 | Yamakami . |
| 5,691,586 | 11/1997 | Yonnet et al. . |
| 5,694,812 | 12/1997 | Maue et al. ......................... 74/471 R |
| 5,730,028 | 3/1998 | Maue et al. ...................... 292/DIG. 43 |
| 5,764,010 | 6/1998 | Maue et al. ......................... 15/250.16 |
| 5,844,382 | 12/1998 | Dan . |

OTHER PUBLICATIONS

"Saab 900 Owners Workshop Manual", Haynes Publishing Group, 1979 through 1985, pp. 172–174, 237.

Machine Design, "Basics of Design Engineering", Jun. 1992, Article "Mechanical Systems".

A paper from the Third Conference on Mechanisms, "Survey of Intermittent–Motion", F.J.Bogardus, 1956, pp. 8–15.

Machine Design, Mechanisms for Intermittent Motion, Dec. 1951, Otto Lichwitz, pp. 134–148.

"Mechanisms for Providing Intermittent Rotary Motion", Product Engineering, Aug. 1949, pp. 116–117.

Machine Design, "Mechanisms for Intermittent Motion, Part 2", Jan. 1952, Otto Lichtwitz, pp. 127–141.

Machine Design, "Mechanisms for Intermittent Motion, Part 3", Feb. 1952, Otto Lichtwitz, pp. 146–155.

Machine Design, "Mechanisms for Intermittent Motion, Part 4", Mar. 1952, Otto Lichwitz, pp. 147–155.

A paper from the Third Conference on Mechanisms, "Designing for Intermittent Motion with Modified Starwheels", Karl E. Kist, pp. 16–20.

"Mechanisms for Engineering Design" "Motion, Circular, Intermittent", Chapter 3, S.B. Tuttle, John Wiley Co., pp. 33–51.

Machine Design, "Modifying Starwheel Mechanisms", Vandeman and Wood, Apr. 1953, pp. 255–261.

"Kinematics of Intermittent Mechanism III—The Spherical Geneva Wheel", Product Engineering, Oct. 1949, S. Rappaport, pp. 137–139.

Machine Design, "Mechanical Systems", Jun. 1992, pp. 130, 132, 168.

"Mechanisms and Dynamics of Machinery", Hamilton H. Mabie and Fred W. Ocvirk, John Wiley & Sons, 1957.

A paper from the International Congress & Exposition, SAE Technical Paper Series 960390, "Liftgate Multiplexed Node", Feb., 1996, H. Winston Maue, pp. 73–76.

"Goodheart–Willcox Automotive Encyclopedia", William K. Toboldt, Larry Johnson, Steve W. Olive, 1989, pp. 279–283.

"Automotive Electronics Handbook", Ronald K. Jurgen, 1995, pp. 19.9–19.15, 30.9.

Exhibit A–(UTA 26 Gate Wiper Motor), prior to Oct. 9, 1997.

Exhibit B–(1996 Ford Windstar Wiper Motor), prior to Oct. 9, 1997.

Exhibit C–(1996 Chevy Blazer Wiper Motor), prior Oct. 9, 1997.

Exhibit D–(1996 Honda Civic Rear Unidirectional Wiper Motor), prior to Oct. 9, 1997.

Exhibit E–(1996 Toyota Direct Drive Unidirectional Wiper Motor), prior to Oct. 9, 1997.

Exhibit F–(1996 Honda Civic Wiper Motor), prior to Oct. 9, 1997.

Exhibit G–(Wiper Motor), prior to Oct. 9, 1997.

Exhibit H–(Wiper Motor), prior to Oct. 9, 1997.

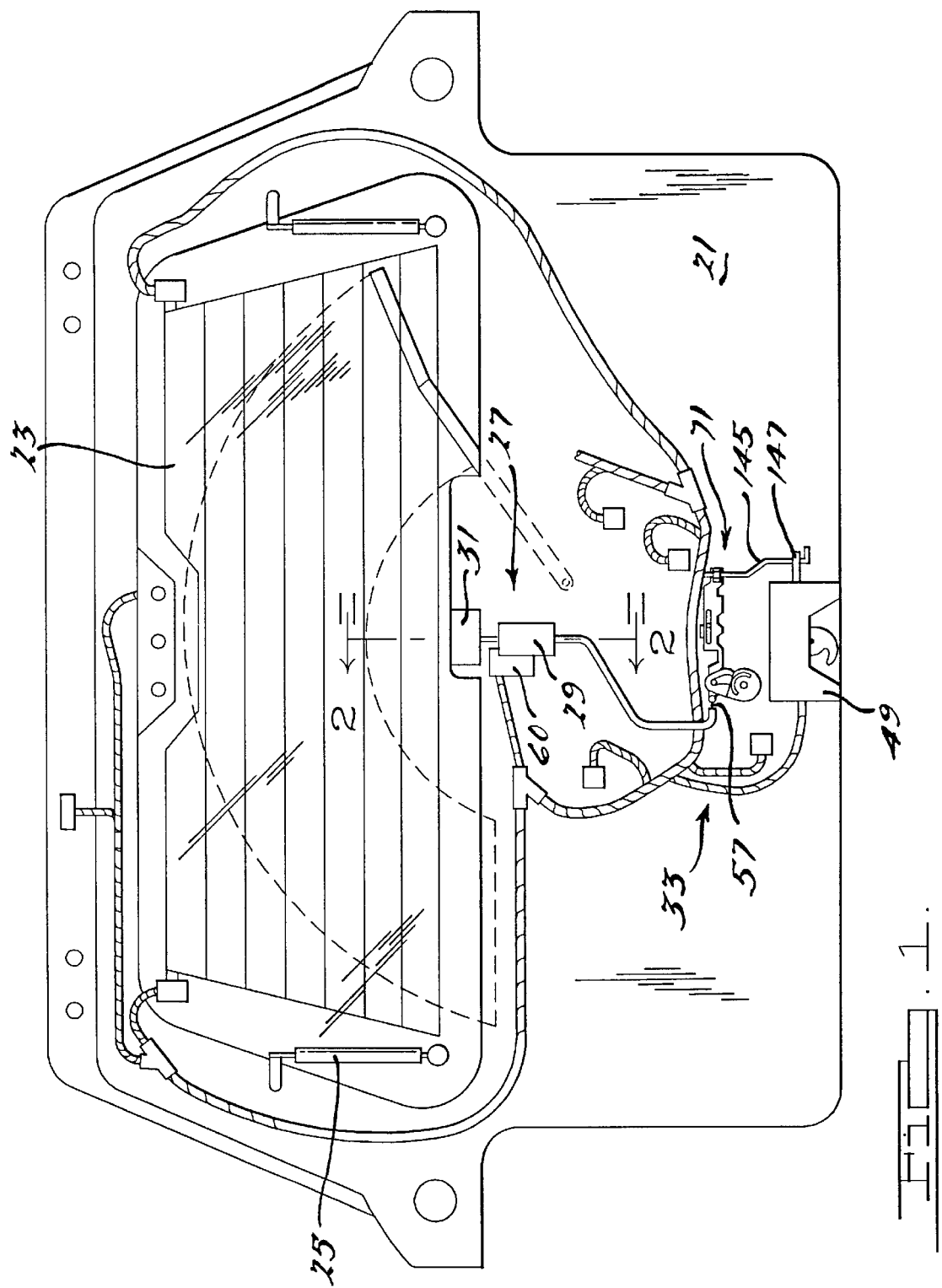

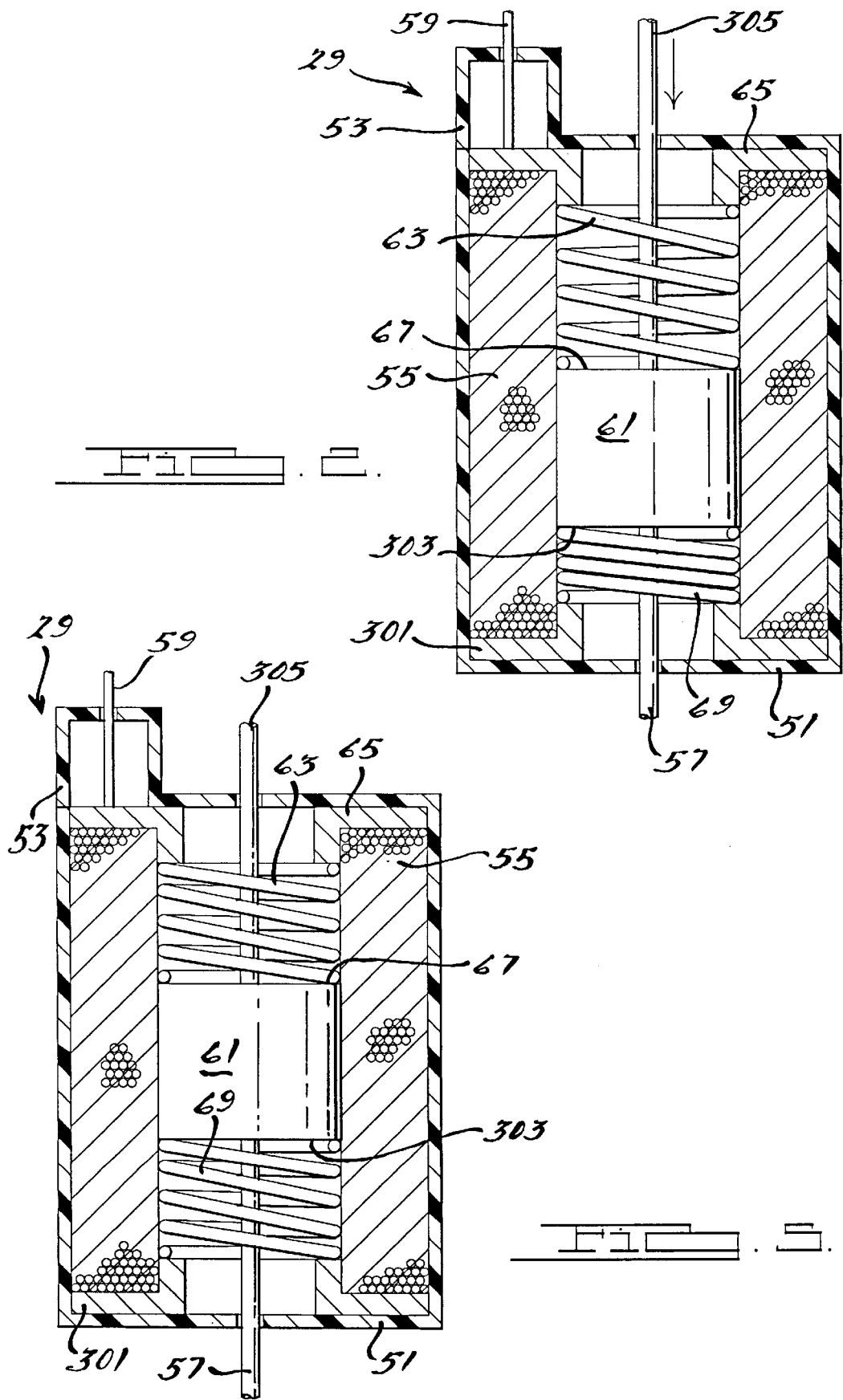

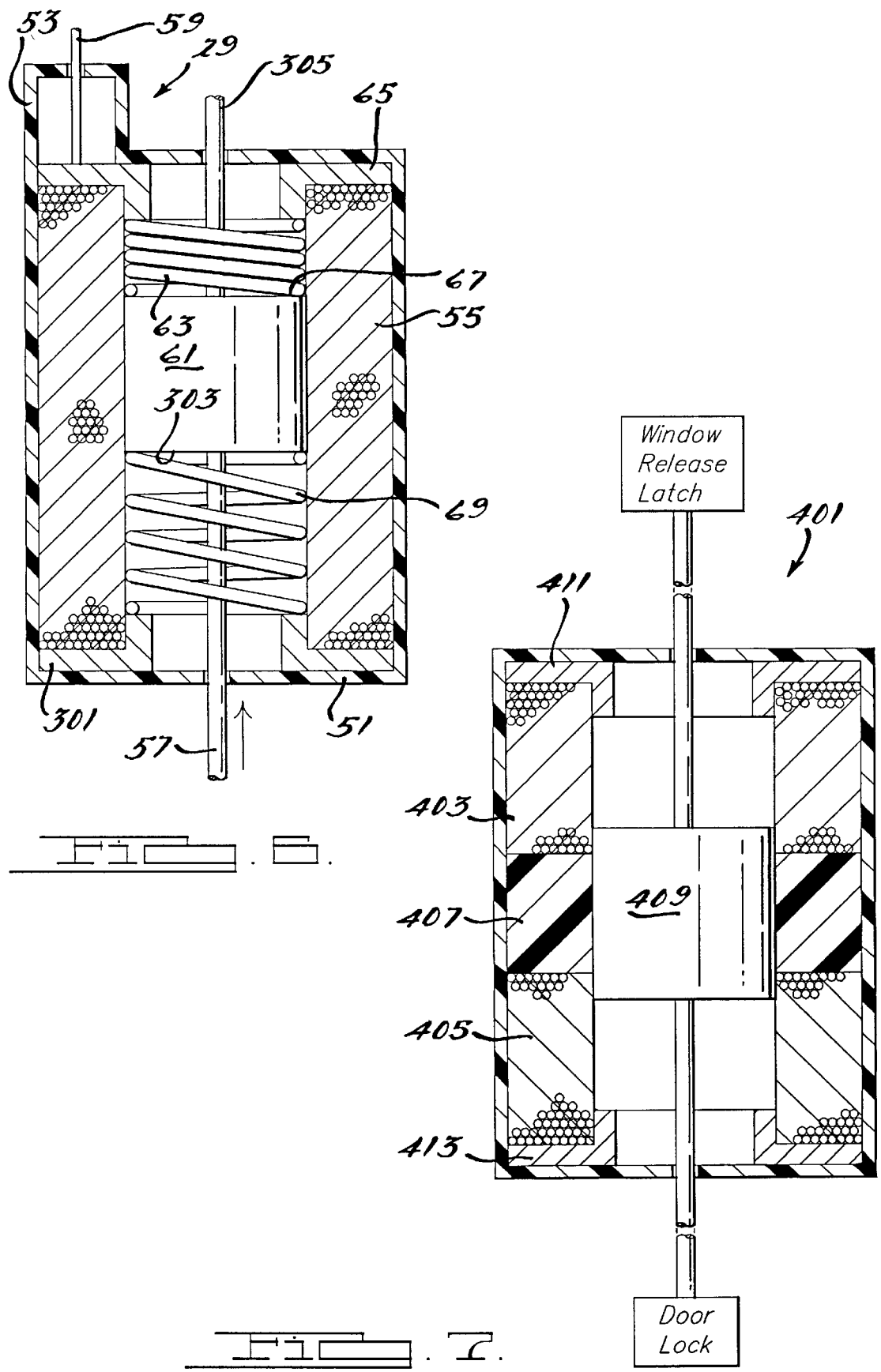

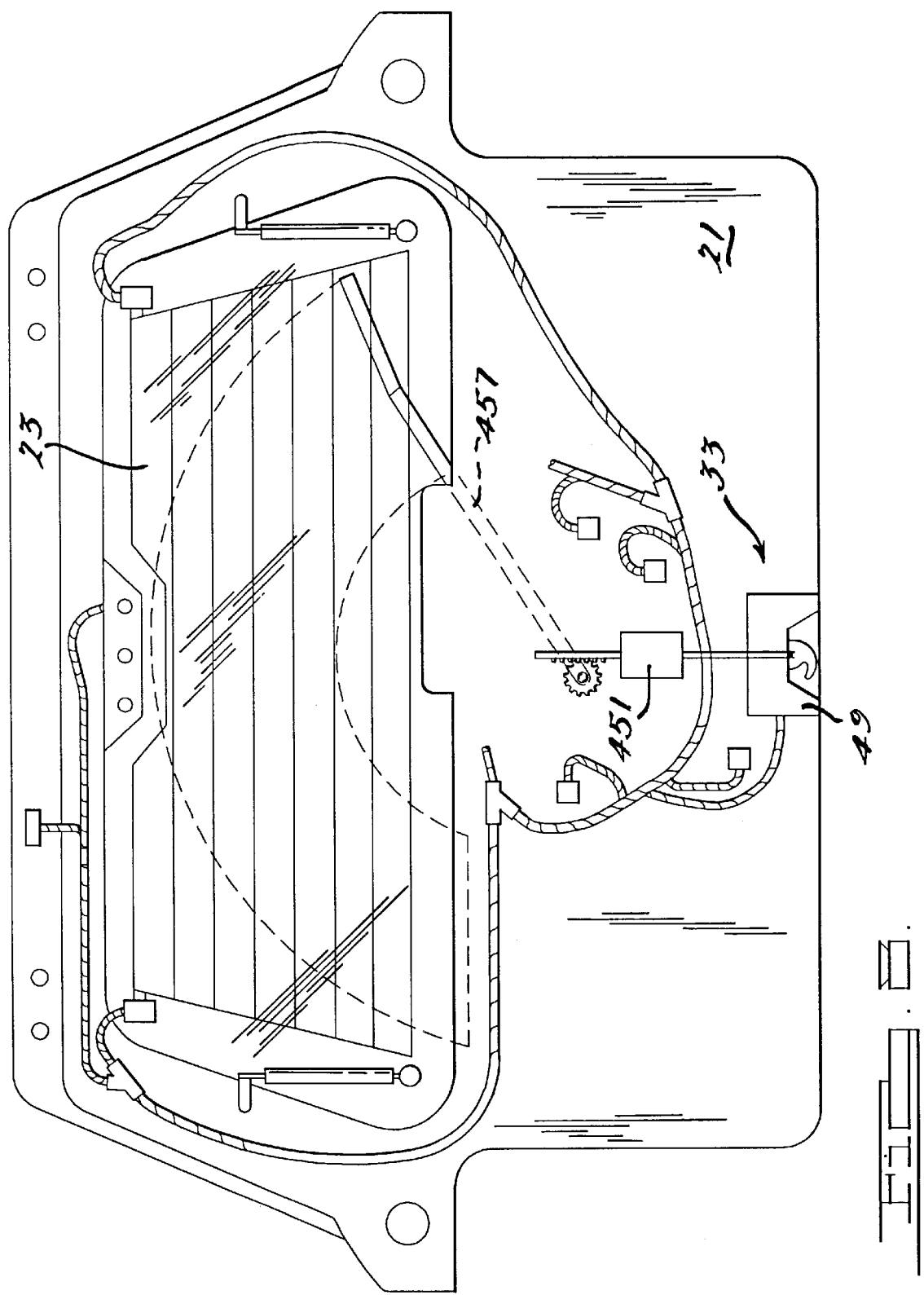

LINEARLY ACTUATING MULTI-FUNCTIONAL APPARATUS FOR USE IN AN AUTOMOTIVE VEHICLE

BACKGROUND OF THE INVENTION

This invention relates generally to multi-functional apparatuses and specifically to a linearly actuating multi-functional apparatus for use in an automotive vehicle.

Almost all automotive vehicles have a single or a pair of windshield wiper assemblies. These assemblies traditionally include rubber wiper blades mounted upon claw brackets. These claw brackets are pivotably attached to wiper arms mounted upon rotating shafts. The shafts are either directly driven by electric motors or driven by a single electric motor which actuates a series or parallel-coupled four bar linkage mechanism. It is further known to provide a wiper system, in combination with a wash device, to clean headlamps for automotive vehicles.

It is also common to employ a window wiper assembly for cleaning rear windows of automotive vehicles. Typically, these types of rear window wiper assemblies include a wiper blade mounted upon a bracket which is coupled to a wiper arm. The wiper arm is attached to a wiper shaft rotatably driven in a cyclically oscillating manner by a helical gear. A reversible, fractional horsepower, direct current electric motor serves to actuate the helical worm gear through an armature shaft-mounted worm gear segment enmeshed therewith. This type of rear window wiper arrangement is usually mounted upon a pivoting liftgate of a minivan, station wagon, sport-utility vehicle or the like. One example is disclosed in U.S. Pat. No. 5,519,258 entitled "System and Method for Controlling Vehicle Lift Gate Window Wiper" which issued to Stroven et al. on May 21, 1996.

Some conventional vehicles also provide a rear window release lock or latch, actuated by a solenoid, which can be unlocked to allow for upward pivotal movement of a rear window in relation to the otherwise stationary liftgate. In combination therewith, a separate liftgate lock is often mounted upon the liftgate door for fastening the liftgate to the body thereby preventing inadvertent pivotal opening. This liftgate lock is traditionally operated by manual key or handle rotation, or through a separate electric motor or solenoid.

Separate motors or solenoids are commonly required to actuate these various locks and the wiper. The traditional need for such a multiplicity of electromagnetic devices has increased the automotive vehicle weight and cost while further proving difficult to package within the often small spaces provided. This added weight is especially detrimental when the window wiper mechanism, rear window lock and liftgate lock, as well as their distinct respective electromagnetic devices, are all incorporated within the pivoting liftgate. Not only is the piece cost increased due to this multiplicity of electromagnetic devices, but the assembly cost, part number proliferation and handling costs, electric wiring costs, objectional motor noise, and failure modes are increased.

Furthermore, U.S. Pat. No. 3,688,332 entitled "Mechanism for Opening and Closing a Cover for a Concealed Windshield Wiper System" which issued to Bellware on Sep. 5, 1972, discloses a windshield wiper driven by an electric motor and an interruptable driving connection controlled by a separate electromagnet. This device further employed levers and pivot pins to open and close a cover. DE 38 07 087 also discloses an electric motor which rotates various mechanisms to drive a rear window wiper and to unlock a rear door; this system has a window fixedly adhered to the rear door. Additionally, an electric motor which rotates and moves axially is disclosed in U.S. Pat. No. 5,045,741 entitled "Dual-Motion Apparatus" which issued to Dvorsky on Sep. 3, 1991.

More recently, PCT Publications WO 96/33891 entitled "Multi-Functional Apparatus Employing an Intermittent Motion Mechanism", WO 96/33893 entitled "Multi-Functional Apparatus Employing an Electromagnetic Device", and WO 96/33892 entitled "Control System for an Automotive Vehicle Multi-Functional Apparatus", all of which were published on Oct. 31, 1996, disclose a significantly improved system wherein a single electromagnetic device can selectively operate intermittent motion mechanisms coupled to a window wiper, a door lock, a window release lock and the like. Notwithstanding, these devices require further refinement and improvement. For example, if the window wiper is frozen onto a window, a door could not be unlocked, with the geneva and starwheel mechanism constructions. Moreover, a car wash or bumpy road could cause the window wiper to undesirably and destructively move from its parked position when a wiper clutch is disengaged, for the split-shaft clutch construction. The split-shaft clutch embodiment also requires further improvements and refinements to increase the durability and robustness of design, while further minimizing the weight of the unit. Furthermore, many of these known devices must translate rotary motion generated by a spinning electric motor and the associated gearing to linear movement for use with door locks and window release latches through use of extraneous, expensive and failure prone gears and levers.

SUMMARY OF THE INVENTION

In accordance with the present invention, the preferred embodiment of a linearly actuating multi-functional apparatus for use in an automotive vehicle includes a single electromagnetic device which linearly operates at least a pair of otherwise independent mechanical devices. In another aspect of the present invention, a plunger of a solenoid is selectively moved between various longitudinal positions in order to directly and linearly move a portion of a first mechanical device interfacing with a window assembly and move a portion of a second mechanical device, such as a door lock or latch. In a further aspect of the present invention, a solenoid linearly operates a rear liftgate window release latch in addition to a second device. In still another aspect of the present invention, a solenoid linearly activates a rear liftgate door lock between locked and unlocked orientations in addition to another device. An additional aspect of the present invention provides actuation of a window wiper by a solenoid. Another aspect of the present invention selectively moves and maintains a plunger in at least three linear positions by use of one or more magnetic fields and/or springs. A method of operating a linearly actuating multi-functional apparatus is also provided.

The linearly actuating multi-functional apparatus of the present invention is advantageous over conventional devices since the present invention employs a single solenoid to operate a pair of door mounted devices which is much less expensive and is lighter weight than an electric motor or a pair of solenoids. Furthermore, the present invention requires less motion transmitting components since linear motion is directly created by magnetism and/or springs rather than the traditional use of various powertrains needed to translate electric motor-created rotational movement to the requisite linear actuation required to operate a door lock and window release latch. It is also significant that a single electromagnetic device of the present invention is suitable for actuating at least two otherwise independently driven mechanical devices that can be remotely located away from each other. Another advantage of the linearly actuating multi-functional apparatus of the present invention is that less control precision and sensing is necessary to cause two or three position travel and actuation of the electromagnetic device as compared to the more complicated feedback patterns employed with traditional rotating gears and electric motors. Additional advantages and features of the present invention will become apparent from the following description and appended claims, taken in conjunction with the accompanying drawings.

BRIEF DESCRIPTION OF THE DRAWINGS

FIG. 1 is a front elevational view showing a first preferred embodiment of a linearly actuating multi-functional apparatus of the present invention;

FIG. 3 is a perspective view showing a door lock mechanical device of the first preferred embodiment linearly actuating multi-functional apparatus;

FIG. 5 is a cross sectional view, similar to that of FIG. 2, showing the solenoid of the first preferred embodiment linearly actuating multifunctional apparatus, disposed in an intermediate travel position;

FIG. 6 is a cross sectional view, similar to that of FIG. 2, showing the solenoid of the first preferred embodiment linearly actuating multi-functional apparatus, disposed in a second end travel position;

FIG. 7 is a cross sectional view, taken along line 2—2 of FIG. 1, showing a second preferred embodiment of the linearly actuating multi-functional apparatus;

FIG. 8 is a front elevational view showing an alternate embodiment of the linearly actuating multi-functional apparatus.

DETAILED DESCRIPTION OF THE PREFERRED EMBODIMENTS

Figure 2:
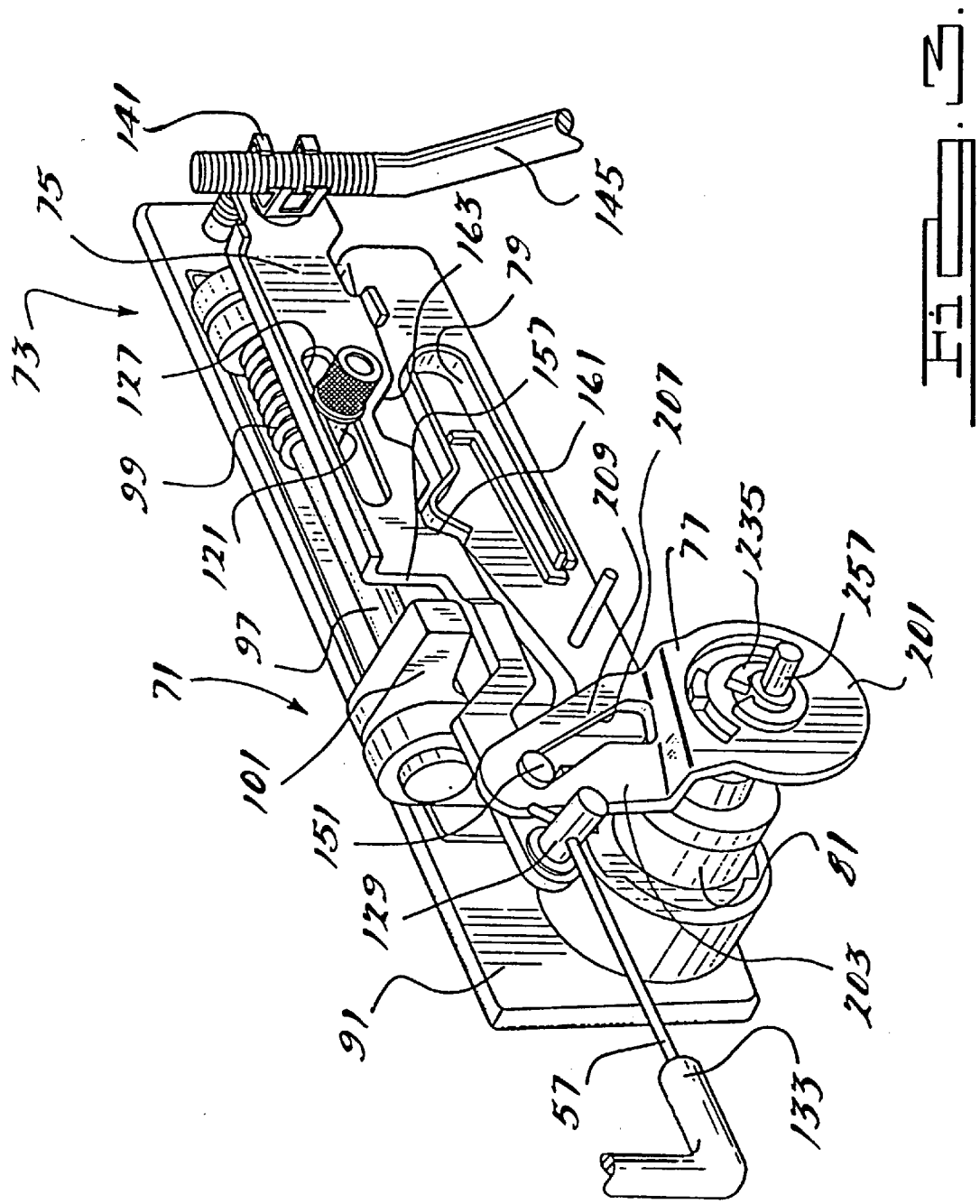
FIG. 2 is a cross sectional view, taken along line 2—2 of FIG. 1, showing a solenoid employed in the first preferred embodiment linearly actuating multi-functional apparatus, disposed in a first end travel position.

An automotive vehicle, such as a minivan, station wagon, sport utility vehicle or the like, has a rear liftgate door 21 which can pivot about a generally horizontal, hinging pivot axis at the top of the door. When the liftgate door is pivoted to an open position, a cargo space or passenger compartment is accessible from behind the vehicle. Such an arrangement is shown in FIG. 1. Liftgate door 21 has a rear window panel or backlite 23 which is pivotable from a closed position, substantially flush with an outer surface of liftgate door 21, to an open position, about a generally horizontal pivot axis near the top of backlite 23. A pair of pneumatic cylinders 25 act to push backlite 23 toward the open position when a lower portion of backlite 23 is released.

The preferred embodiment of a linearly actuating multi-functional apparatus 27 of the present invention is mounted upon an inner surface of liftgate door 21. The majority of apparatus 27 is hidden by an interior trim panel (not shown). As will be described in further detail hereinafter, apparatus 27 includes an electromagnetic device, such as a solenoid 29, coupled to a first mechanical device, such as a window release latch 31, and to a second mechanical device, such as a door lock assembly 33. Door lock assembly 33 includes a door lock latch 49 pivotably engagable with a striker projecting from a body of the automotive vehicle. Door lock assembly 33 further includes a lock/unlock mechanism 71 coupled to solenoid 29 by way of a flexible cable 57 or, alternately, a generally rigid rod.

The first preferred embodiment of the solenoid employed in the present invention is illustrated in FIG. 2. Solenoid 29 has a plastic housing 51 and an end cap which integrally includes an electrical connector portion 53. A single group of copper wire coils or windings 55 are disposed in an annular manner around a bobbin (not shown) inside housing 51. Furthermore, a magnetic flux conducting can (not shown) is disposed between the outer portion of wire windings 55 and housing 51 unless housing 51 is metallic. Two or three (for a ground lead) electrical connector blades 59 are connected to wire windings 55 and are accessible at electrical connector portion 53 for attachment to an electricity conducting wire harness or a multiplexed rear node electronic control unit, such as a microprocessor 60 (see FIG. 1).

A permanent magnet plunger 61 has a circular-cylindrical external shape and is longitudinally movable in a linear manner within a longitudinally oriented bore inside of the bobbin and wire windings 55. In this embodiment, a compression spring 63 is located between a first end stop 65 and a first end face 67 of plunger 61. Similarly, a second compression spring 69 is located between a second end stop 301 and a corresponding second end face 303 of plunger 61. Cable 57 is either pressfit to plunger 61 or coupled by a lost linkage device inside of plunger 61 depending on the functional actuating positions required. An oppositely extending rod or cable 305 is joined to plunger 61 in a pressfit or threaded manner. Alternately, plunger 61 may be conductive iron for single direction actuation or can be provided with a multiple stepped outer periphery.

As can best be observed in FIG. 3, the preferred embodiment of the door lock/unlock mechanism 71 includes a handle assembly 73, a linearly slidable door lock control member or link 75, a rotatable cam 77, a detent tensioning spring 79 and a key lock cylinder 81. Handle assembly 73 has an aesthetically pleasing, injection molded polymeric bezel 91, a driver accessible handle (not shown), a metallic pivot pin 97 and a helically coiled biasing spring 99. A handle protrusion 101 is integrally injection molded with the handle and is hidden within the liftgate door. Spring 99 acts to normally bias the handle to a latched position generally flush with the appearance side of bezel 91. The handle is manually activated to pivot about pivot pin 97. Key lock cylinder 81 is received within a key lock cylinder sleeve integrally molded with bezel 91. Thus, a tumbler section of key lock cylinder 81 is exposed to the exterior of the automotive vehicle for insertion of a manually rotatable key. Detent spring 79 is affixed to the forward facing and hidden surface of bezel 91 and is received within mating ribs and an adjacent slot. Detent spring 79 is preferably injection molded from a nylon polymeric material.

Door lock control member 75 is slidably attached to the hidden surface of handle bezel 91 via a pivot post 121, washer and nut. Post 121 may either be integrally formed as part of bezel 91, or may be separately crimped or otherwise secured to bezel 91 such that post 121 can be metallic. Pivot post 121 is slidably received within a linearly elongated slot 127 defined by an interior edge. Lubricant is also applied.

A partially threaded cable securing pedestal 129 and retention washer serve to secure a distal end of flexible metal cable 57 to an end of door lock control member 75. A directly applied crimp or other cable securing means can alternately be employed. Bendable, yet longitudinally rigid, cable 57 freely slides within a somewhat flexible metal sheath 133. The opposite end of door lock control member 75 has a stamped metallic claw 141 and polymeric spacer secured thereon. A threaded end of a generally cylindrical and elongated lock rod 145 is mounted within claw 141. The lower end of lock rod 145 is coupled to lever 147 (see FIG. 1) of door lock latch 49 (also see FIG. 1).

A metal cam follower 151, having an external cylindrical surface, depends from a face of door lock control member 75. A standoff also partially surrounds cam follower 151 immediately adjacent to the face of door lock control member 75. Door lock control member 75 further has a clearance notch 157 disposed in an upper peripheral edge. A pair of detent notches 161 and 163 are additionally disposed within a lower peripheral edge of door lock control member 75. Detent notch 161 corresponds to a locked position of door lock control member 75 while detent notch 163 corresponds to an unlocked position of door lock control member 75. Door lock control member 75 additionally has a turned upper edge segment to add stiffness to the part. Door lock control member 75 is preferably stamped from low carbon 1040 grade steel.

Rotatable cam 77 has a body 201 and a peripherally depending tab 203. A plane of tab 203 is offset but parallel to a plane of body 201 to maximize packaging space. A portion of a peripheral edge corresponding with body 201 has a generally circular shape while the portion of the peripheral edge surrounding tab 203 has a somewhat triangular shape with a rounded tip. A first internal edge 207 defines an elongated slot within tab 203. A camming surface segment 209 of internal edge 207 is preferably straight and is provided with an angle of 125 degrees as measured from the nominal horizontal sliding axis of door lock control member 75. A lower segment of internal edge 207 is transversely enlarged beyond the corresponding transverse dimension of cam follower 151; this provides for easy installation and insertion of cam follower 151 within the slot of rotatable cam 77. Significantly, internal edge 207 completely surrounds the elongated slot and forms a continuously closed shape. Rotatable cam 77 is preferably stamped from low carbon, cold rolled steel, grade 1018.

Body 201 of rotatable cam 77 further has a second internal edge defining a centrally positioned, key-holed aperture for mating in registry with a corresponding retainable protrusion projecting from key lock cylinder 81. A stamped metal snap ring 235 is then secured upon protrusion 233 on the outside of rotatable cam 77.

In operation, handle protrusion 101 can fully abut against the turned edge segment for pivoting door lock control member 75 about pivot post 121 when solenoid 29 is moved to the position shown in FIG. 6 or the key cylinder is manually moved. Accordingly, door lock control member 75 raises door lock linkage 145 for unlatching door latch 49 (see FIG. 1). Concurrently, cam follower 151 freely slides within the elongated slot defined by internal edge 207 in a lost motion manner. Tensioning detent spring 79 is also compressed during this pivoting movement. Handle protrusion 101 is caused to abut against and pivot door lock control member 75 in response to a person pulling up on the handle.

Appropriate energization/deenergization of solenoid 29 to the position shown in FIG. 3 (or FIG. 2 if only a two position solenoid is used) pushes cable 57 which slides door lock control member 75 to a locked and latching position. In this locked position, handle protrusion 101 can freely move within clearance notch 157 without sufficiently abutting against and pivoting door lock control member 75 to cause unlatching. Furthermore, tensioning spring 79 engages detent notch 161. Also, pivot post 121 has been linearly slid along slot 127 and cam follower 151 has moved along the slot defined by internal edge 207 in a lost motion manner.

In the manually overridden unlatching situation, door lock control member 75 is maintained in a locked state but manual key and key cylinder tumbler rotation simultaneously rotates rotatable cam 77. This causes cam follower 151 to ride along camming surface 209 of internal edge 207. Concurrently, door lock control member 75 is pivoted about pivot post 121 such that door lock linkage 145 is raised to unlatch door lock latch 49 (see FIG. 1).

Figure 4:
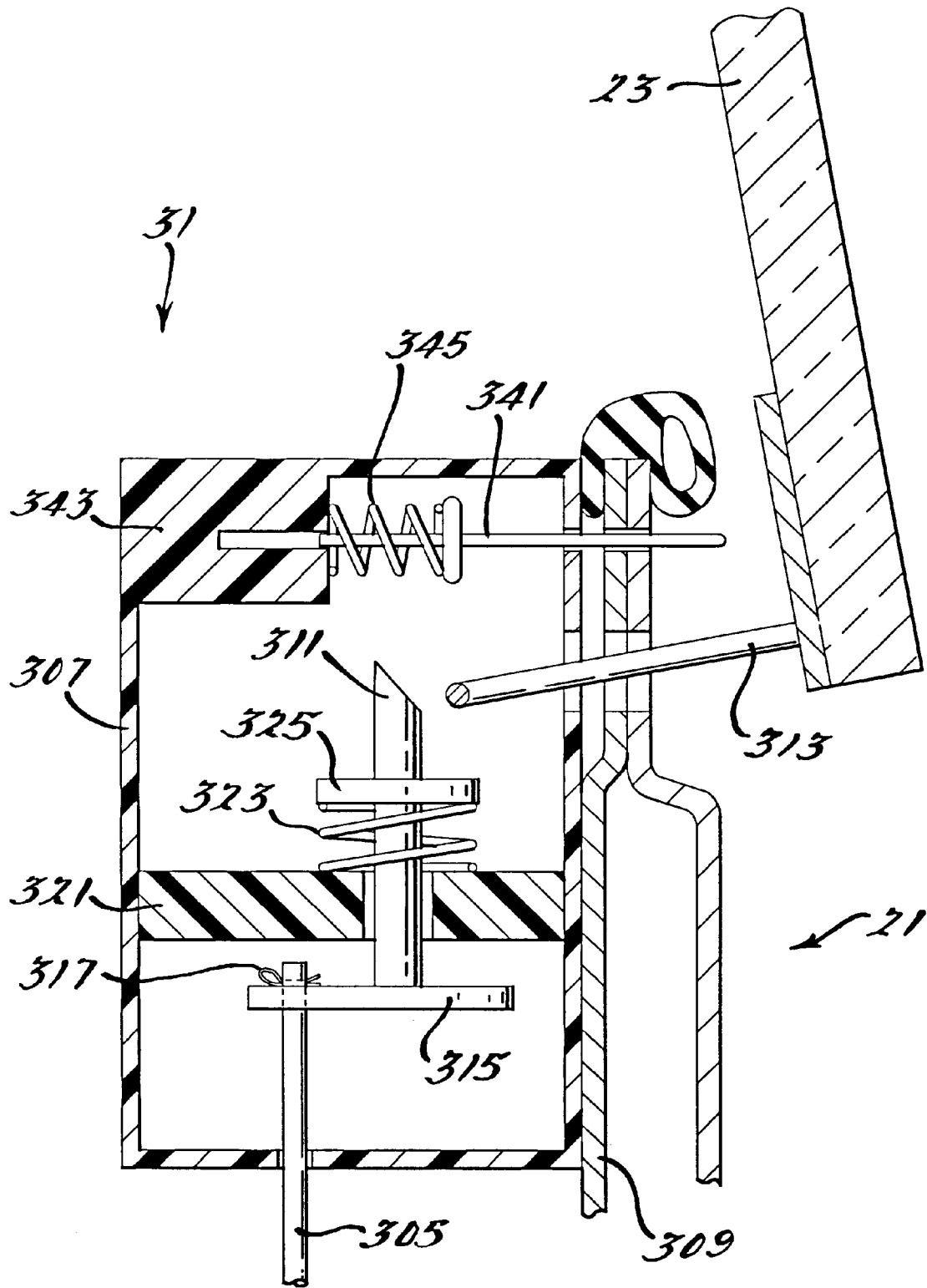
FIG. 4 is a diagrammatic cross sectional view, taken along line 2—2 of FIG. 1, showing a window release latch mechanical device of the first preferred embodiment linearly actuating multi-functional apparatus.

Referring to FIG. 4, window or liftglass release latch 31 includes a plastic housing 307 bolted to an inner sheet metal panel 309 of tailgate door 21. A steel bolt 311 is disposed in housing 307 for operably engaging and disengaging with a U-shaped striker 313 adhered to backlite 23. A lower platform 315 of bolt 311 is coupled to connecting rod 305 by way of a cotter pin 317. A clearance space is optimally provided between a top end of rod 305 and a retaining shelf 321 of housing 307 such that rod 305 can be moved upwardly independent of platform 315 in a one-way lost motion manner. A compression spring 323 is employed to bias an intermediate platform 325 of bolt 311 upwardly away from shelf 321 of housing 307. Accordingly, bolt 311 is urged to engage and interface with striker 313 of the window assembly unless downwardly pulled by rod 305.

A finger 341 is biased away from a receptacle 343 of housing 307 by another compression spring 345. A distal end of finger 341 is either disposed above a weather strip or protrudes through an aperture of liftgate door 21 for abutting against a metal plate adhered to window 23. Accordingly, finger 341 will outwardly push a bottom portion of backlite 23 away from liftgate door 21 when bolt 311 is retracted and no longer interfacing with striker 313.

Bolt 311 of window release latch 31 is retracted when wire windings 55 of solenoid 29 are energized in a first current carrying direction to magnetically move plunger 61 in a linear direction from the position of FIG. 5 to that of FIG. 2, to compress spring 69 against end stop 301. In this event, it may be desirable to employ a lost motion coupling between rod 57 and plunger 61 to prevent actuation of the door lock assembly every time the backlite is released.

FIG. 5 shows the neutral or intermediate position of solenoid 29. In this condition, solenoid 29 is deenergized and springs 63 and 69 have biased plunger 61 to an intermediate travel position. This intermediate travel position coincides with the bolt of the window release latch being in its advanced and window interfacing position as well as the nominal locked orientation of the door lock assembly. Plunger 61 is moved in a reverse linear direction by employing a relay in combination with the microprocessor to reverse the polarity and, thus, the direction of electrical current flowing through wire windings 55 thereby reversing the magnetic poles within solenoid 29.

A second preferred embodiment of the multi-functional apparatus of the present invention is shown in FIG. 7. In this embodiment, a solenoid 401 employs two distinctly separate groups of wire windings 403 and 405 separated by a nonconductive insulator 407. A magnetically conductive plunger 409 is magnetically moved in a first linear direction by energization of wire windings 403 and deenergization of wire windings 405. This will move the door lock assembly from a locked intermediate position coinciding with the intermediate position of plunger 409 (as shown in FIG. 7) to an unlocked condition coinciding with movement of plunger 409 against an end stop 411. Similarly, plunger 409 is magnetically moved in a linear manner toward an opposite end stop 413 when wire windings 405 are energized and wire windings 403 are deenergized. This reverse movement causes the window release latch to disengage the window assembly. Energization of both groups of wire windings 403 and 405 causes plunger 409 to move back to its intermediate position as long as both of the wire windings are energized, and to be maintained in this intermediate position by the compression springs. Friction of the cables and mechanisms, along with detents, will also serve to maintain positions of the plunger even when the solenoid is deenergized. Hence, three actuating functional positions can be achieved through magnetic forces (and without springs) causing strictly linear actuation and force transmission to otherwise independently operable mechanical devices. The solenoid of the present invention can be constructed in such a manner that an air gap between a multistepped plunger and the wire windings would decrease as the plunger moves. This provides a means to determine the travel position of the plunger from the reduction in impedance to the electrical circuit. Thus, an impedance sensor would eliminate the need for a more expensive microswitch to obtain feedback on the plunger's location.

Figure 10:
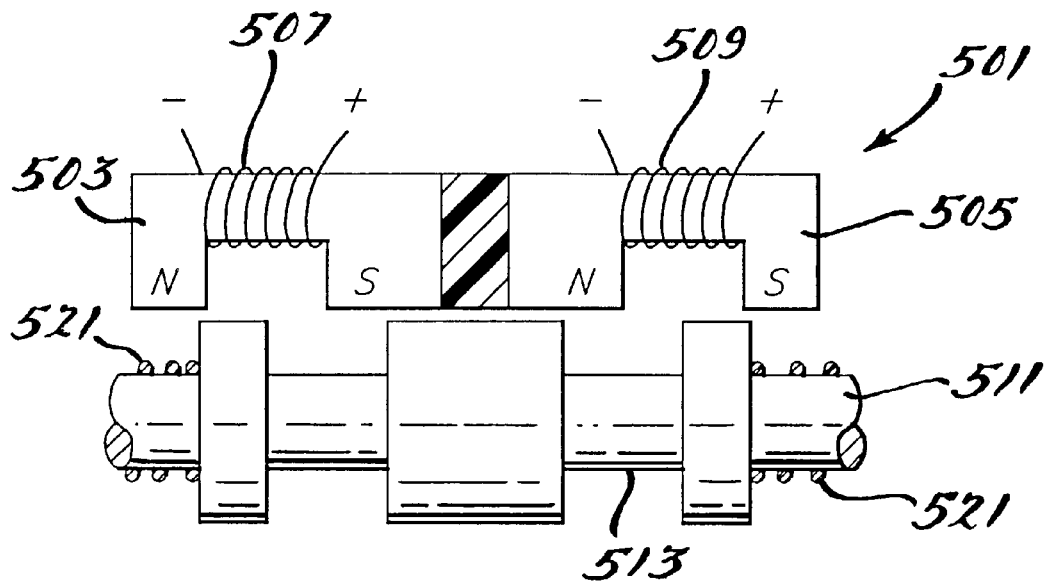
FIGS. 10 and 11 are diagrammatic cross sectional views showing a solenoid of a third preferred embodiment linearly actuating multi-functional apparatus, disposed in two positions.
Figure 11:
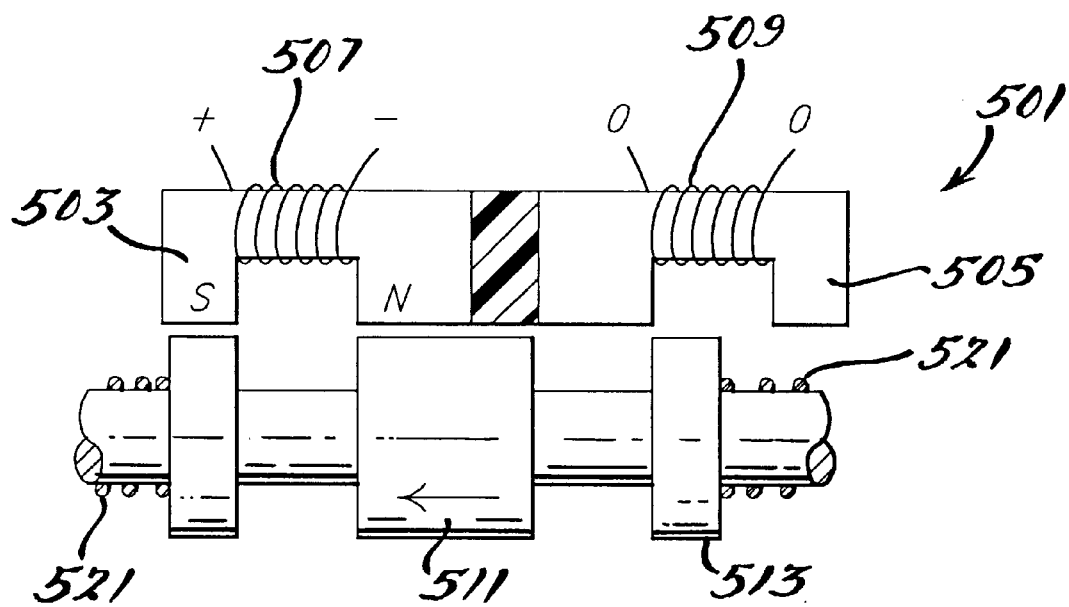

Another preferred embodiment is shown in FIGS. 10 and 11. This solenoid 501 has a pair of electromagnets 503 and 505 of a U-cross sectional shape energized by wire windings 507 and 509, respectively. An insulator is disposed between the wire windings. A plunger 511 has a stepped peripheral surface 513 consisting of alternating cylindrically-shaped, cross sectional projections and depressions. Two light compression springs 521 are located to urge plunger 513 away from end stops (not shown) toward an intermediate position. The electrical polarity is reversed between wire windings 507 and 509 in order to reverse the magnetic field and causing opposite linear movement of plunger 511.

If necessary, however, rods extending from the solenoid plunger can be coupled to a pivoting lever to achieve a reversal of actuating direction. Moreover, a more simplistic two position solenoid plunger can be employed to create three linearly actuated functions by coupling a push-push mechanism to one of the rods extending from the plunger. In this variation, a heart-shaped structure and spring wire arm can bias a single lock cable or rod between two different positions in response to repeated linear pushing force. For example, reference should be made to U.S. Pat. No. 5,050,922 entitled "Overhead Console having a Pivotable Storage Shelf-Door" which issued to Falcoff on Sep. 24, 1991, which is incorporated by reference herein. Other pushpush mechanisms can be employed, such as those which use a rotating cam and spring which can move a coupled cable or rod between different orientations in response to repetitive linear pushes.

Figure 9:
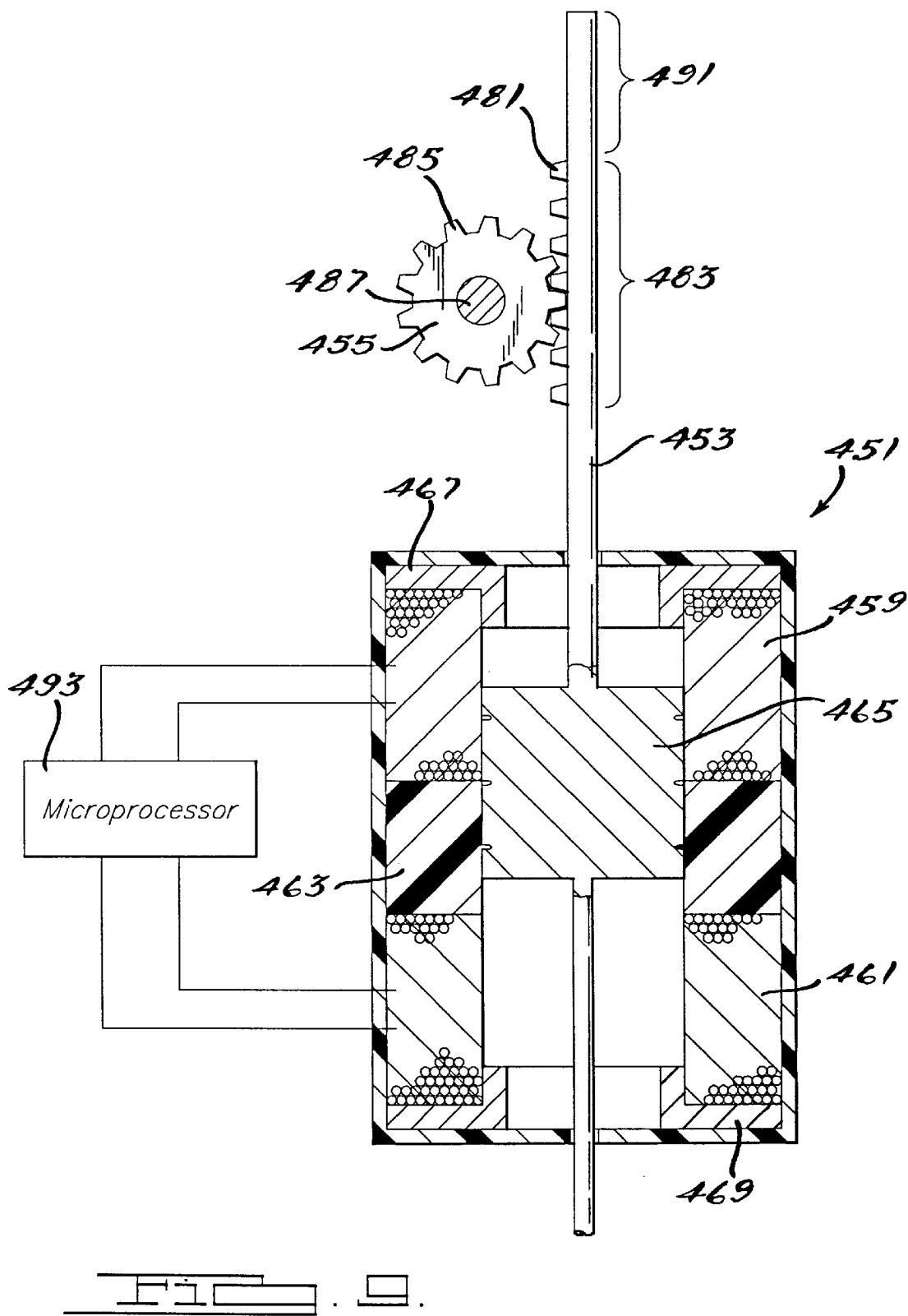
FIG. 9 is a cross sectional view showing the alternate embodiment linearly actuating multi-functional apparatus.

Referring now to FIGS. 8 and 9, an alternate embodiment of the multi-functional apparatus of the present invention provides a single but very strong solenoid 451 having a rack 453 coupled to a pinion gear 455 for driving a window wiper assembly 457 in a back and forth oscillating manner interfacing with backlite 23. A door lock assembly such as that disclosed with regard to the preferred embodiments is also employed with solenoid 451. A pair of distinct groups of wire windings 459 and 461 are separated by a nonconductive insulator 463. A magnetically conductive plunger 465 is linearly moved between end stops 467 and 469 inside of solenoid 451. Rack 453 is pressfit or otherwise firmly attached to plunger 465 for concurrent linear movement therewith. Teeth 481 are disposed on a middle portion 483 of rack 453 for enmeshing with externally projecting teeth 485 of pinion gear 455. A window wiper shaft 487 rotates simultaneously with pinion gear 455 for driving window wiper assembly 457. Accordingly, when plunger 465 is moved in a linear manner between an intermediate position and an end travel position adjacent to end stop 465, rack 453 will drive window wiper assembly 457 throughout its window wiping path.

However, when energization of wire windings 459 and 461 are reversed (in other words, only one winding is energized and then the other, but not both), plunger 465 will move against end stop 469 in a linear manner thereby moving wiper shaft 487 and wiper assembly 457 to a park position off of backlite 23 while also actuating the door lock assembly between locked and unlocked positions, and vice versa, through use of a push-push mechanism or the like. In order to achieve this separation of functions, a lost motion section 491 is provided on rack 453 wherein this section 491 is free of rack teeth. A microprocessor 493 suitably controls energization of the appropriate group of wire windings 459 and 461 to sense, move and maintain the plunger in its appropriate travel location in response to various driver accessible controls. It is also shown that detent bumps inwardly projecting from a bobbin and plunger grooves can be set at the desired functional positions to mechanically maintain the plunger in the corresponding travel location. Sufficient magnetic force would be applied to move the plunger between the detent bumps.

While various embodiments of the linearly actuating multi-functional apparatus have been discussed, it should be appreciated that many other configurations can be employed with the present invention. For example, other electromagnetic devices, such as linear motors or the like, can be substituted for the disclosed solenoid to provide strictly linear movement for directly operating two different mechanical devices. Furthermore, other mechanical devices than those disclosed herein can be used. Various materials have been disclosed in an exemplary fashion, however, other materials may of course be employed. It is intended by the following claims to cover these and any other departures from the disclosed embodiments which fall within the true spirit of this invention.

The invention claimed is:

1. A multi-functional apparatus for use in an automotive vehicle, said apparatus comprising:

a single electromagnetic device having at least one magnetic field generating member and a movable internal member, said at least one magnetic field generating member being energizable to magnetically move said internal member in a first linear direction;

a portion of a door engaging mechanical device moving between engaging and disengaging orientations in response to movement of said internal member in said first linear direction; and a portion of a second mechanical device moving in response to movement of said internal member in a second linear direction, said mechanical devices being separated from each other;

whereby said portions of said mechanical devices are selectively operated by actuation of said single electromagnetic device in said linear directions.

2. The apparatus of claim 1 wherein said second linear direction is opposite from said first linear direction.

3. The apparatus of claim 2 wherein said electromagnetic device is a solenoid and said internal member is a plunger.

4. The apparatus of claim 3 wherein said solenoid includes:

an outer housing;

at least one stop located in said housing;

a single group of wire windings defining said at least one magnetic field generating member being located in said housing and having a longitudinally oriented bore; and at least one spring located between an end of said plunger and said at least one stop for biasing said plunger away from said at least one stop, said plunger being magnetically movable in a linear manner in said longitudinally oriented bore;

wherein said at least one spring biases said plunger in one of said linear directions and said plunger compresses said at least one spring when said wire windings are energized to move said plunger in the other of said linear directions.

5. The apparatus of claim 3 wherein said solenoid includes:

an outer housing;

at least one stop located in said housing;

at least two separate groups of wire windings defining said at least one magnetic field generating member being located in said housing and having a longitudinally oriented bore; and an insulator disposed between said at least two groups of wire windings;

wherein said plunger moves in said first linear direction when a first of said groups of wire windings is energized and when a second of said groups of wire windings is deenergized;

wherein said plunger moves in said second linear direction when said first of said groups of wire windings is deenergized and said second of said groups of wire windings is energized.

6. The apparatus of claim 1 further comprising a door and a window movably mounted to said door, wherein said second mechanical device is a window release latch operable to allow said window to move relative to said door and said door engaging mechanical device is a door lock.

7. The apparatus of claim 1 further comprising a door and a window movably attached to said door, wherein said second mechanical device is a window wiper.

8. A multi-functional apparatus for use in an automotive vehicle, said apparatus comprising:

a rear door of said automotive vehicle;

a rear window assembly pivotably mounted to said rear door;

a solenoid;

a first mechanical device mounted on said rear door, a portion of said first mechanical device moving in response to linear actuation of said solenoid in a first direction; and a second mechanical device interfacing with said rear window assembly, a portion of said second mechanical device moving in response to linear actuation of said solenoid in a second direction.

9. The apparatus of claim 8 wherein said solenoid includes a plunger linearly movable in a first end travel position, an opposite second end travel position, and an intermediate travel position between said end travel positions, whereby each of said travel positions of said plunger actuates a different function of said mechanical devices.

10. The apparatus of claim 9 further comprising a microprocessor mounted to said rear door being electrically connected to said solenoid for selectively causing said plunger to move between said travel positions.

11. The apparatus of claim 8 wherein said first mechanical device is a door lock having said portion movable from a locked orientation to an unlocked orientation and back again.

12. The apparatus of claim 8 wherein said second mechanical device is a window release latch.

13. The apparatus of claim 8 wherein said second mechanical device is a window wiper shaft.

14. A method of operating a multi-functional apparatus for use in an automotive vehicle having a rear door, a rear window assembly, a first device, a second device and an electromagnetic actuator, said method comprising the steps of:

(a) electrically energizing said electromagnetic actuator to cause a magnetic field;

(b) linearly moving an internal member of said electromagnetic actuator in a first direction in response to step (a);

(c) linearly moving said internal member of said electromagnetic actuator in a second direction opposite said first direction;

(d) contacting said rear window assembly with said first device;

(e) moving a portion of said first device in response to linear movement of said internal member; and (f) moving a portion of said second device in response to linear movement of said internal member.

15. The method of claim 14 further comprising the steps of:

(a) locking a rear door lock by linearly moving said internal member; and (b) unlocking a rear door lock by linearly moving said internal member, said second device being defined as a door lock.

16. The method of claim 15 further comprising the steps of:

(a) linearly moving said internal member in said first direction a first time to lock said rear door lock; and (b) linearly moving said internal member in said first direction a second time to unlock said rear door lock.

17. The method of claim 14 further comprising the steps of determining a position of said internal member by sensing impedance in an electrical circuit.

* * * * *